UNITED STATES PATENT OFFICE.

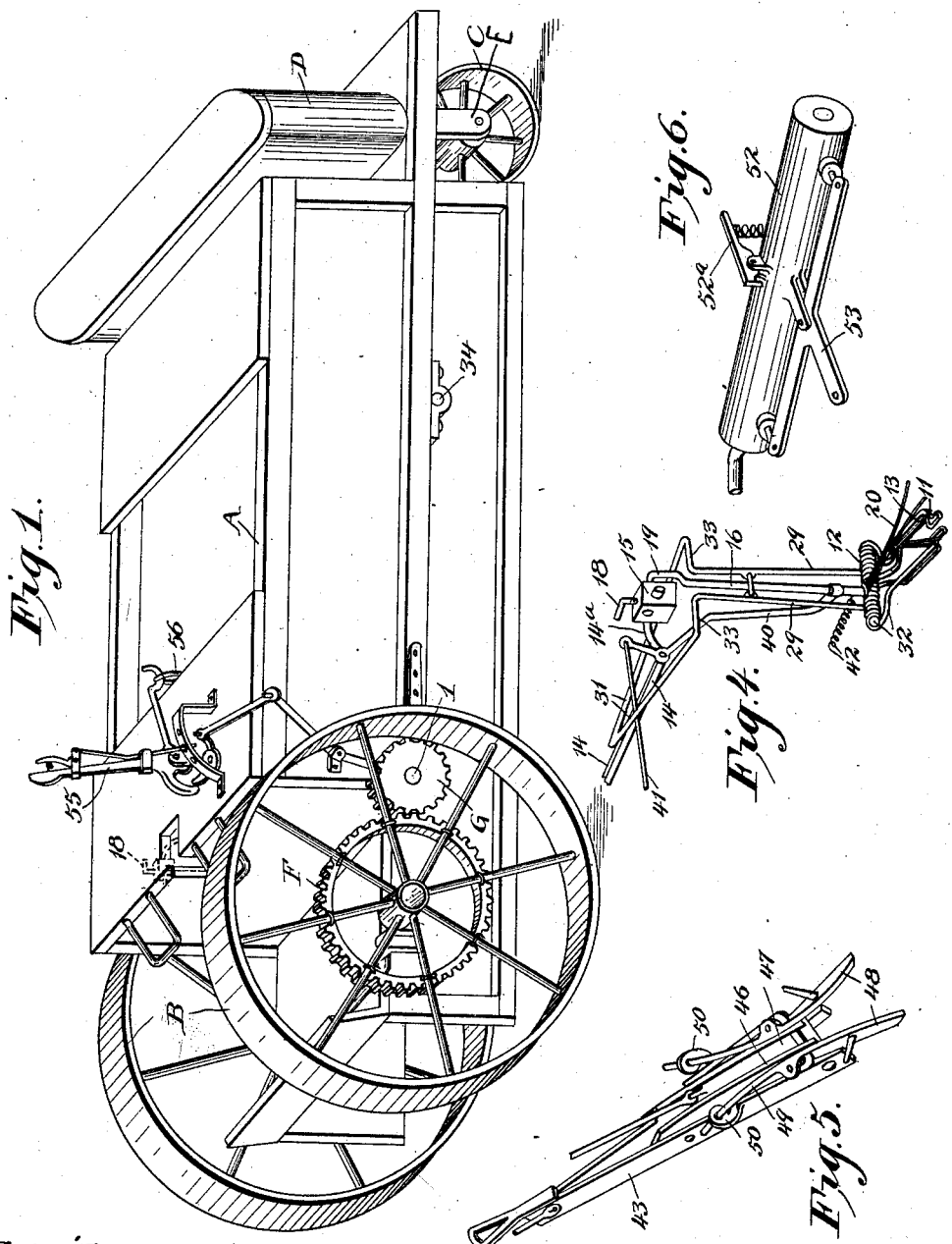

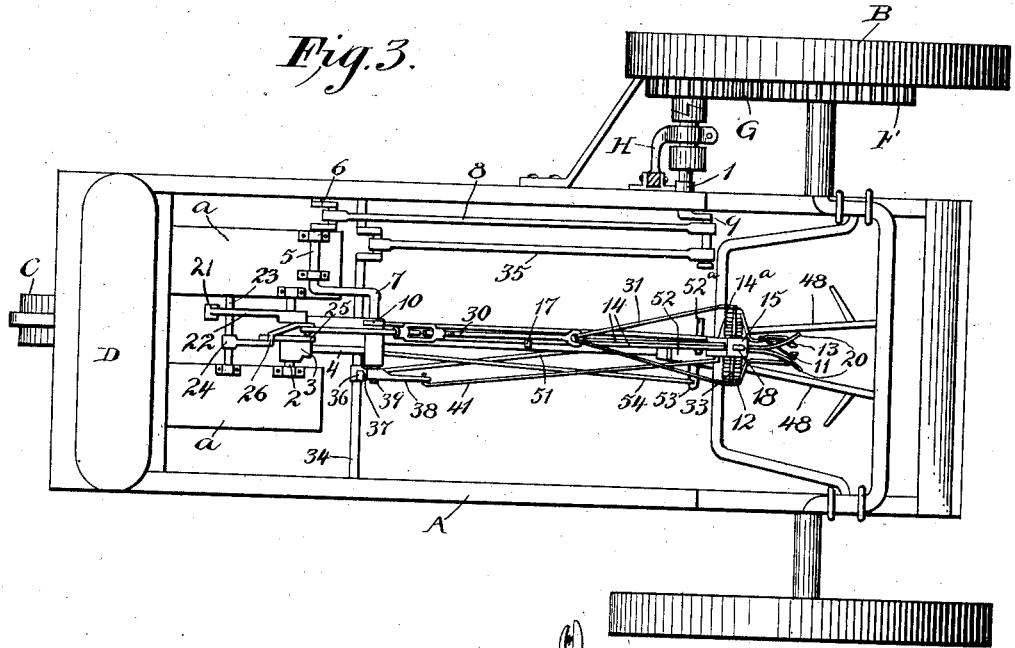
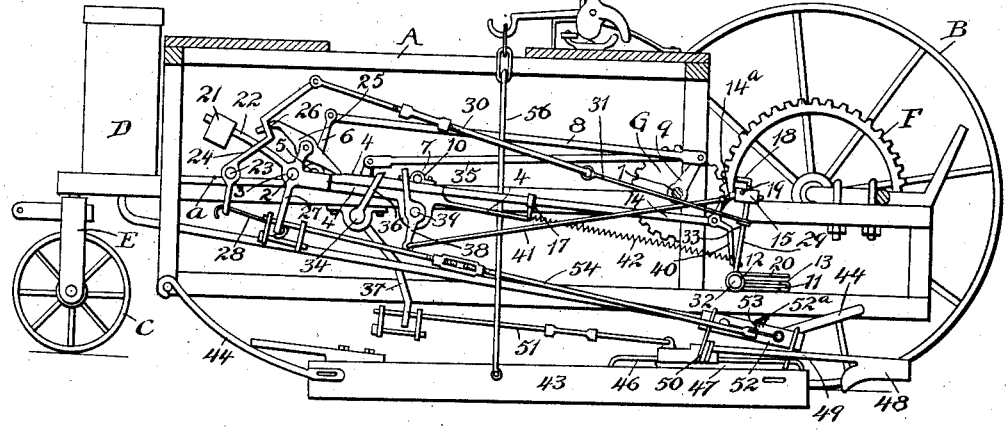

ARENT CHRISTOPHER URDAHL, OF VIROQUA, WISCONSIN.

TOBACCO SELF-TRANSPLANTER.

1,044,304.   Specification of Letters Patent.   Patented Nov. 12, 1912.

Application filed April 14, 1910. Serial No. 555,542.

*To all whom it may concern:*

Be it known that I, ARENT CHRISTOPHER URDAHL, a citizen of the United States, residing at Viroqua, in the county of Vernon and State of Wisconsin, have invented a new and useful Tobacco Self-Transplanter, of which the following is a specification.

This invention relates to machines for transplanting tobacco plants and it is an improvement on the type of construction shown in my prior U. S. Patent No. 818,586 of April 24, 1906.

The machine herein proposed embodies the same general instrumentalities which are employed in the construction shown in my patent referred to and its operation is also generally similar to that of the patented machine, involving the acts of opening a furrow, setting the plants in the furrow, watering the roots; and covering and packing the roots with earth.

The present machine, however, embodies several features of improvement over my former machine having for their purpose a simpler, less expensive, lighter and more efficient construction.

The features of improvement will be particularly specified as the description proceeds.

The invention is illustrated in the accompanying drawings wherein:

Figure 1 is a perspective view of the improved transplanting machine; Fig. 2 is a central longitudinal sectional view thereof; Fig. 3 is a top plan view thereof; Fig. 4 is a perspective view of the plant holder and its appurtenant mechanism; Fig. 5 is a perspective view of the furrow opener and the root covering device associated therewith. Fig. 6 is a detailed view of the sprinkler with a mounted lever for controlling the flow of water.

Similar characters of reference designate corresponding parts throughout the several views.

The operating parts are assembled with relation to a main frame A having at its rear end the traction wheels B and at its front end the caster wheel C. The latter is carried by a bracket E which is attached to a platform that supports the water tank D. One of the traction wheels B is utilized as an agent for operating the instrumentalities of the machine and accordingly is fitted with a spur wheel F which gears with a pinion G. The pinion G is loose on a transverse shaft 1 which has support in the frame A and which carries a suitable clutch device H for engagement with the pinion G to cause the shaft to turn with the pinion.

The frame A includes a pair of supporting members *a*, which sustain a transverse shaft 2. Upon the latter is mounted a member 3 which for convenience will be hereafter referred to as a "sweep" and includes two parallel supporting arms 4. The arms 4 are arranged in superimposed relation, as shown in Fig. 3 of the accompanying drawings, and the sweep 3 is operated from the shaft 1 through the agency of positive connections which comprise a shaft 5 supported by one of the members *a* and having angularly disposed crank arms 6 and 7; a link 8 connecting the crank arm 6 with a crank arm 9 provided on the shaft 1; and a bearing 10 carried by the uppermost arm 4 directly connects the crank arm 7 and the arm 4 of the sweep 3. The sweep 3 directly effects the raising and lowering of the plant holder and is also instrumental, through positive connections, to effect the operations of certain of the related mechanisms of the machine.

The plant holder, *per se*, is indicated by the numeral 11 and is made of spring wire fashioned to afford a transverse coil 12 and opposed clamp engaging jaws 13 which are preferably faced with rubber or other equivalent material to prevent injury to the plants. The support for the plant holder preferably comprises an arm 14 which is fixed to the sweep 3 and projects rearwardly therefrom, a box 15 which is mounted for turning adjustment at the rear end of the arm 14, and a hanger 16 which is pivoted to the box 15 and has its lower end suitably fastened in the coil 12. The arm 14 is preferably made of connected parallel rods and extends through a sleeve 17 supported between and preferably integrally connecting the arms 4 of the sweep 3. The extreme inner end of the arm 14 is suitably fastened to the hub portion of said sweep. The box 15 is adapted to be adjusted on the arm 14 as a pivot in order to dispose the plant holder at any angle which may be necessitated by irregularities or inclinations of the surface of the ground and said box is held at any desired position by a set screw 18 which frictionally engages the end of the arm 14. The hanger 16 is adapted to be swung forwardly and rearwardly as the operation of the machine proceeds and it has at its upper end a lateral extension 19 which is journaled in a transverse opening or bearing in the box 15. The purpose of the swinging movement of the hanger is to secure an erect positioning of the plants in the ground and in furtherance of this purpose the hanger 16 may be provided above the plant holder with a resilient clip 20 of fine spring wire or any suitable material which has a light engagement with the plants.

As the machine moves over the ground the sweep 3 will be oscillated and will thus effect the raising and lowering of the plant holder, the plants being inserted between the jaws of the holder when the latter is in its uppermost position and being released by said jaws when the plant holder is in its lowermost position. In order that the movements of the sweep may be effected without shocks or racking of the machine, a counterbalance weight 21 is mounted on an arm 22 which projects forwardly from the sweep.

The mechanism for effecting the opening of the spring jaws of the plant holder at the extremes of the movement of said holder will now be described. The members a furnish support for a transverse shaft 23 which is arranged forwardly of the shaft 2 and upon which is mounted a two armed rocker 24. The rocker 24 is operated by two distinct devices from the sweep 3. One of these devices consists of a trip arm 25 which is carried on the upper side of the sweep and which is formed to engage an offset 26, in the upper arm of the rocker and to actuate the latter when the plant holder is in its lowermost position. The arm 25 is effective in such engagement to swing the upper portion of the rocker forward. The other device for actuating the rocker is effective when the plant holder is in its uppermost position and consists of a downward extension 27 of the sweep 3 and a link 28 connecting said extension and the lower arm of the rocker. The link 28 has its ends formed as hooks or in equivalent fashion for engagement over the parts which it connects in order that there may be no operation of the rocker from the extension 27 until the sweep 3 has about completed its upward movement.

The rocker 24, operated in the manner described, in turn effects the opening of the jaws 13, the connections for this purpose consisting of vertical rock shafts 29, a rod 30 connected to the upper end of the rocker 24 and links 31 connecting the rear end of the rod 30 and the shafts 29. The rod 30 is preferably made in sections which are connected by a turnbuckle, this arrangement providing for suitable adjustments of the length of said rod. The shafts 29 have lateral support from the hanger 16 and are provided at their lower ends with respective arms 32 which extend in opposite directions and are fitted in the coil 12, and at their upper ends with respective oppositely extending arms 33 to which the links 31 are joined. It will be apparent that when the upper arm of the rocker 24 is moved forwardly by the devices described at the limits of the movement of the sweep and of the plant holder, it will be effective through the agency of the parts 30, 31 and 29 to cause the spreading or opening of the jaws 13, and to provide on the one hand for the introduction of a plant between said jaws and on the other hand for the disengagement of the plant by the jaws. During the major portion of each stroke of the sweep, the rocker 24 is, of course, not acted on by the devices provided for its operation and the plant holder by virtue of its own resilience is effective to close its jaws and to reset the rocker.

For producing the swinging movement of the hanger 16 and also for effecting the operation of the devices which cover the roots of the plant, a shaft 34 is provided. The latter has support in the frame A and is located in rear of and below the shaft 2. The shaft 34 is driven from the shaft 1, a connecting link 35 being employed which extends between the crank arm 9 of the shaft 1 and a crank of the shaft 34. The shaft 34 is provided with upper and lower arms 36 and 37. The arm 36 forms an element of the connections for swinging the hanger 16 and is operative to engage the upper arm of a rocker 38. The pivot of the latter is mounted in a bearing 39 carried by the lowermost arm 4 of the sweep. The arm 14 is provided just forwardly of the box 15 with an offset 14ª carrying a bracket to which is pivoted an angle lever 40. The lower end of the lever 40 is suitably connected to the hanger 16 and the upper end of said lever is connected to a link 41 which in turn is connected with the lower arm of the rocker 38. The rocker 38 is engaged by the arm 36 as the plant holder comes into its lowermost position and the action of said rocker when thus engaged, is, through the intermediary of the link 41 and the lever 40 to swing the hanger 16 rearwardly to a perpendicular position and to thus secure an erect disposal of the plants when they are placed in the earth. The hanger 16 and its associated parts are restored to their normal positions by a coil spring 42 which is connected to said hanger and to a bracket on the arm 14.

The furrow opener is indicated by the numeral 43 and is of the same general form shown in my prior patent referred to, being carried by swinging supports 44. At the rear end of the furrow opener a pair of raised longitudinal bars 46 are provided which constitute guide and retaining means for a slide 47. Blades 48 are pivoted on the latter for horizontal swinging movement. The office of the blades 48 is to cover the roots after the plants have been deposited and the blades are effective for this purpose by a combination of forward and inward swinging movements. The blades 48 are provided with forward outwardly curved extensions 49 which pass through loops 50 fixed on the furrow opener. As the slide 47 is drawn forwardly the loops 50 act on the extensions 49 and produce the aforesaid inward movements of the blades. For causing the reciprocatory movement of the slide 47, the arm 37 of the shaft 34 is employed, said arm and said slide being connected by a link 51 which is made in sections connected by a turn buckle for the purposes of adjustment and which has pin and slot connection with the arm 37.

For watering the roots of the plants a reservoir 52 is employed. This reservoir is connected by a flexible hose to the tank D and is suitably mounted at the rear end of the furrow opener, its action being controlled by suitable valves. These valves are operated by a T lever 53, the central arm of which is connected by a link 54 with the depending extension 27 of the sweep. The link 54 is made in sections connected by a turn buckle in order that suitable adjustments of the length of said link may be made. The connection between the extension 27 and the link 54 consists of the well known pin and slot device employed to allow of relative sliding movement between the connected parts. In addition to the valves for effecting the discharge of water from the reservoir it is preferred to employ a cut off valve 52ª which is operated by the foot in case the machine should be stopped while water is being delivered from the reservoir 52.

The furrow opener is raised or lowered by means of a hand lever 55 mounted on a cross bar of the frame A and connected to said furrow opener by a link 56.

In operation, in accordance with the upward and downward movements of the sweep 3 the plant holder 11 is raised and lowered, the plant holding jaws being automatically opened when the plant holder is in its uppermost position to receive the plants delivered normally thereto from a shelf or platform of the frame 1 and being again automatically opened when the plant holder is in its lowermost position to deliver the plants into the furrow. As the plant holder comes into its lowermost position the hanger 16 is swung rearwardly to secure an erect positioning of the plants. Thereafter the valves of the reservoir 52 are operated to water the roots and the slide 47 is advanced whereby the blades 48 cover the roots with soil.

Having fully described my invention, I claim:

1. In a transplanting machine, a wheeled frame, an oscillatory sweep, an arm directly connected to and projecting rearwardly from the sweep, a plant holder supported from the rear end of said arm and raised and lowered thereby in accordance with the movement of the sweep, a crank shaft connected directly to the sweep to produce the oscillatory movement thereof, a main driving shaft driven from a wheel of the machine and having a crank arm, and a link connecting the crank arm of the main driving shaft and said crank shaft.

2. In a transplanting machine, a wheeled frame, an oscillatory sweep, driving connections between a wheel of the machine and said sweep to produce the oscillatory movement of the latter, an arm projecting rearwardly from the sweep and raised and lowered thereby, a hanger pivotally depending from the rear end of said arm for forward and rearward swinging movement, a plant holder provided at the lower end of the hanger and means for swinging the hanger to a perpendicular position as the arm comes into its lowermost position to secure thereby an erect delivery of the plants.

3. In a transplanting machine, a wheeled frame, an oscillatory sweep, gearing between a wheel of the frame and the sweep for producing the oscillatory movement of the latter, an arm projecting rearwardly from the sweep and raised and lowered thereby, a block mounted on the rear end of the arm for pivotal adjustment in a transverse vertical plane, a hanger depending from the block and a plant holder carried at the lower end of the hanger.

4. In a transplanting machine, a wheeled frame, an oscillatory sweep, gearing between a wheel of the frame and the sweep for producing the oscillatory movement of the latter, an arm projecting rearwardly from the sweep, a plant holder supported from the rear end of the arm and including a pair of relatively movable jaws, a rock shaft associated with each jaw, a rocker, operative connections between the rocker and the rock shafts, and devices operable in accordance with the movements of the sweep to its uppermost and lowermost positions for swinging the rocker rearwardly and thereby effecting the opening of the jaws of the plant holder.

5. In a transplanting machine, a wheeled frame, an oscillatory sweep, gearing between a wheel of the frame and the sweep for producing the oscillatory movement of the latter, an arm projecting rearwardly from the sweep, a plant holder supported from the rear end of the arm and comprising a section of resilient wire fashioned to form a coil and plant holding jaws projecting therefrom, a pair of rock shafts having relatively opposite extensions at their lower ends which are fitted in the coil and having also relatively opposite extensions at their upper ends, a rocker, a rod connected thereto, links connecting the rod and the respective upper arms of said rock shafts, and devices operable in accordance with the movements of the sweep to its uppermost and lowermost positions for swinging the rocker rearwardly and thereby effecting the opening of the jaws of the plant holder.

6. In a transplanting machine, a wheeled frame, a plant holder, a vertically movable support for the plant holder, gearing operated from a wheel of the frame for raising and lowering the support, the plant holder consisting of a section of resilient wire fashioned to afford a transverse coil and plant engaging jaws projecting therefrom, a pair of rock shafts having at their lower ends relatively opposite extensions which are fitted in the coil, means for turning the rock shafts and thereby opening the jaws, and means for operating the rock shaft turning means when the plant holder comes into its uppermost and lowermost positions.

7. In a transplanting machine, a wheeled frame, an oscillatory sweep, gearing for operating the sweep from a wheel of the frame, an arm projecting rearwardly from the sweep and directly secured thereto, a plant holder supported at the rear end of the arm and having a pair of movable plant engaging jaws, a two armed rocker pivoted forwardly of the sweep, connections between the rocker and the jaws, the rocker having an offset in its upper arm, a trip arm carried by the sweep to engage the offset when the sweep comes into its lowermost position and to thereby effect a movement of the rocker to produce the opening of the jaws, the sweep having a downward extension, and a link connecting the extension and the lower arm of the rocker, the link being effective to operate the rocker as the sweep comes into its uppermost position.

ARENT CHRISTOPHER URDAHL.

Witnesses:
 E. S. GOODELL,
 THOS. CHRISTOFERSON.

---

Copies of this patent may be obtained for five cents each, by addressing the "Commissioner of Patents, Washington, D. C."